Patented Nov. 21, 1944

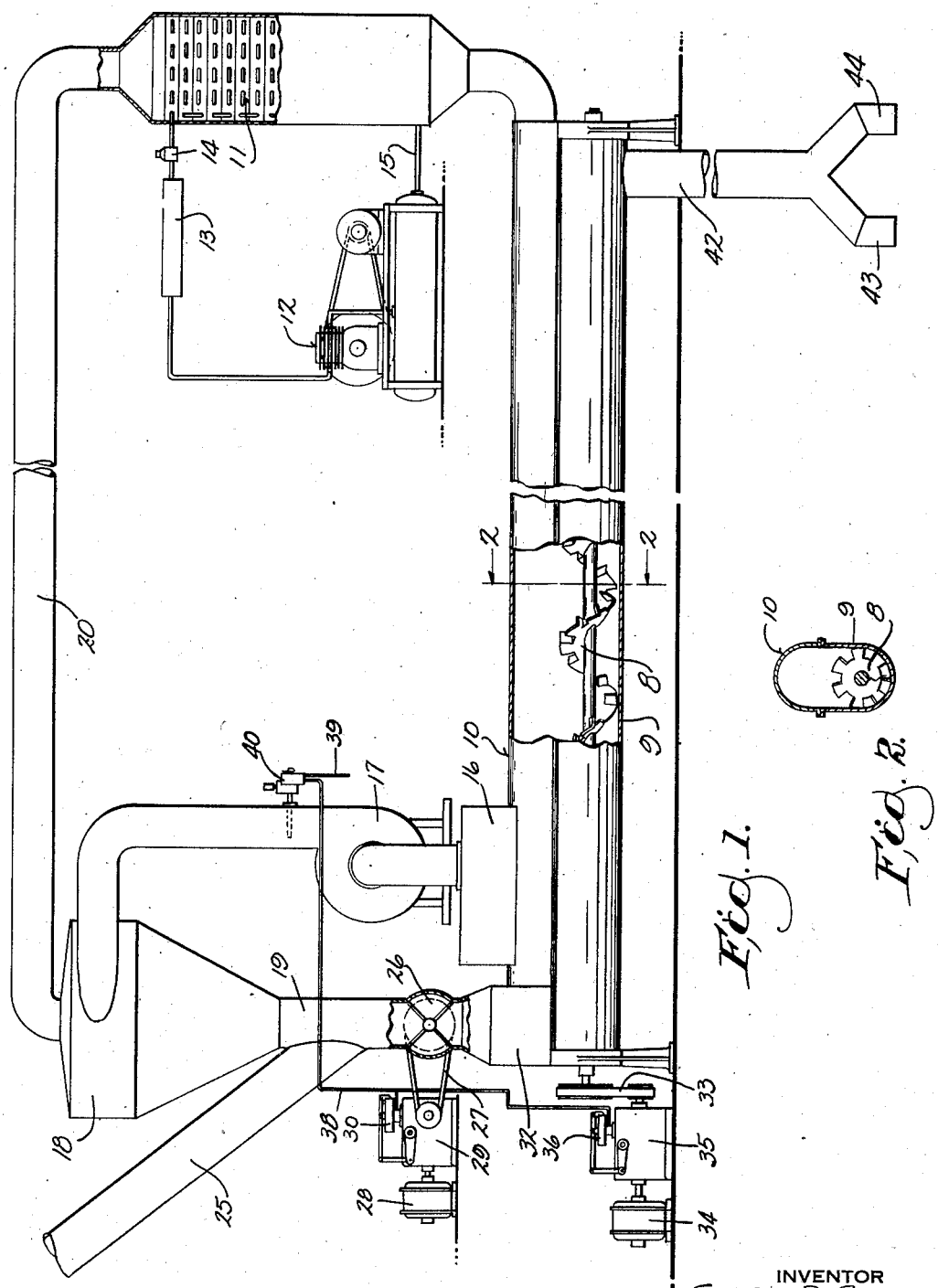

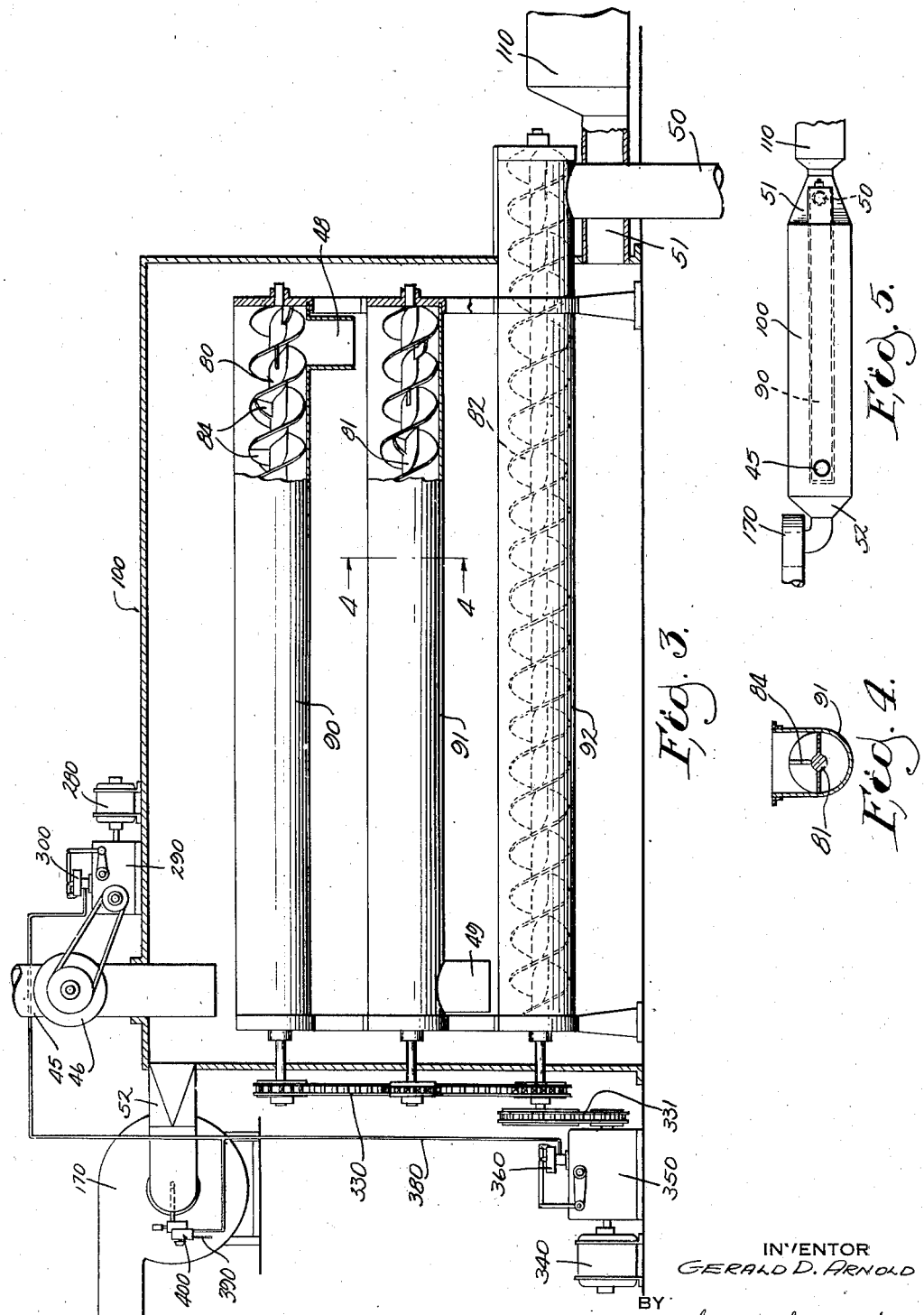

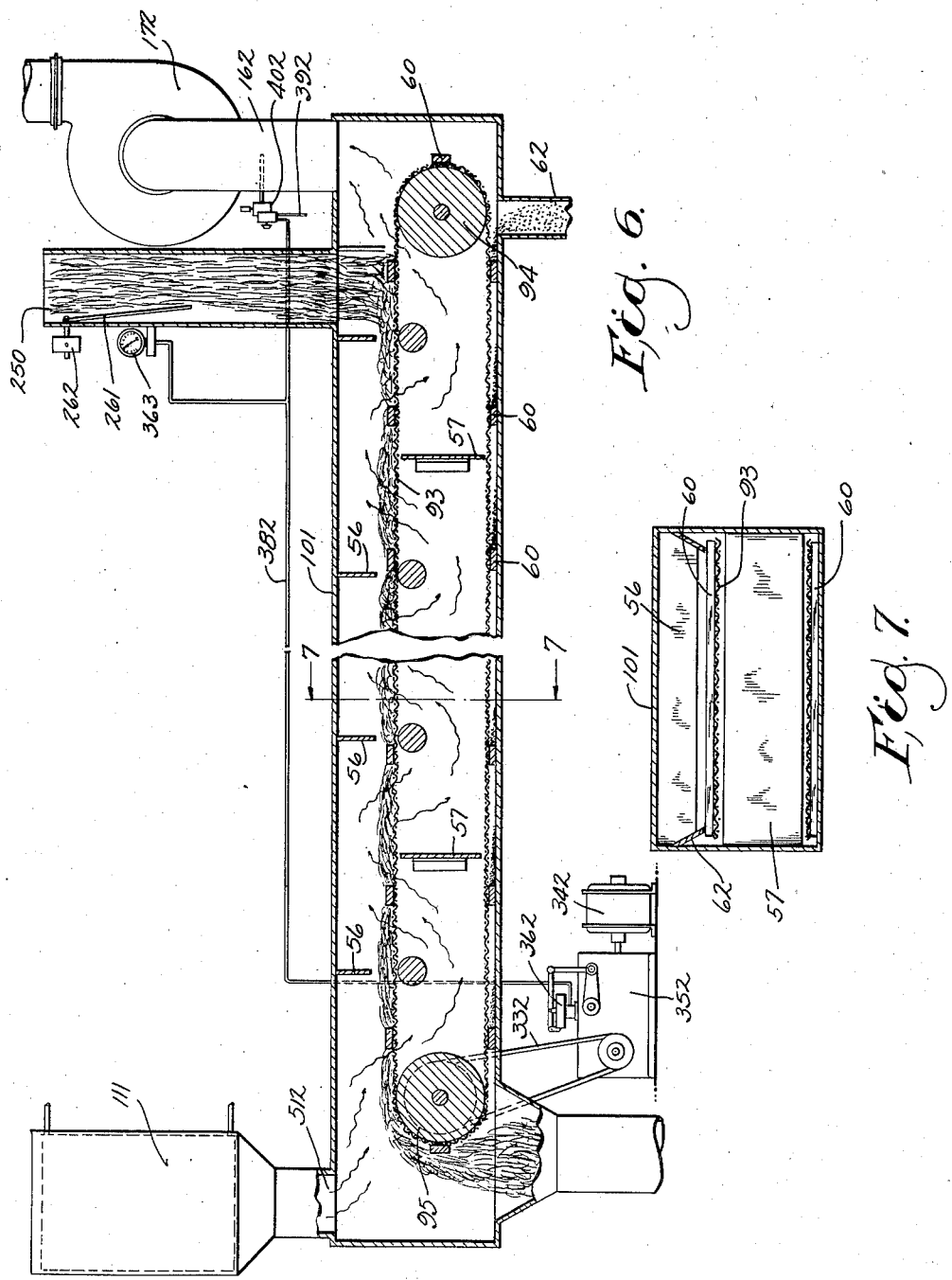

2,363,037

UNITED STATES PATENT OFFICE 2,363,037

ART OF PRESERVING VALUABLE ELEMENTS OF ORGANIC MATERIALS IN DRY STORAGE

Gerald D. Arnold, Wauwatosa, Wis.

Application October 3, 1941, Serial No. 413,420

12 Claims. (Cl. 34—11)

This invention pertains to improvements in the art of preserving valuable elements of organic materials in dry storage. The present application is a companion to my applications Serial No. 231,110 filed September 26, 1938, now Patent No. 2,241,654 of May 13, 1941, and Serial No. 311,639 filed December 29, 1939, now Patent No. 2,266,292 of December 16, 1941.

The major objects of the present invention are the same as those specified in the companion applications above identified, viz.—the preservation of color and vitamin content, during extended storage periods, in organic materials which have become highly heated as in dehydration or otherwise. The invention also has for its objective a method in which a product initially highly heated may be cooled as well as dehydrated by the passage of a cold gas across it. While the invention has particular reference to herbaceous foods, it has a wider application to animal as well as vegetable foods for consumption by human beings as well as by stock and fowl. Even more broadly, the invention applies to the retention of valuable ingredients in any organic product, one particularly valuable application of the invention involving the dissipation of heat from fertilizers following dehydration.

Heat, sufficient to cause degeneration, may be imparted to organic material by the atmosphere or it may be generated during the process of cutting, dehydration, or grinding. If this heat is allowed to remain in the material during extended storage periods, it promotes fermentation, oxidation, and enzymetic and bacterial action to the detriment of the product.

The present invention contemplates an organization in which heat transfer from the material to the air is direct, without any intervening partition of any nature, the arrangement, however, being such that the material to be chilled is mechanically propelled and agitated where necessary, thus adapting the cooling operation to a variety of materials which may not be of such a nature that they can be pneumatically conveyed in the cooling currents as contemplated in my previous invention.

It is a further important object of the invention to provide means whereby the rate of material propulsion can be accurately proportioned to the cooling effect achieved by the air to the end that substantially the entire refrigerating capacity of the air will be exhausted in a single traverse and will, in any event, be kept substantially uniform, uniformity of the output being one of the important considerations in a device of this character.

Even when the cooling medium comprises saturated chilled air, there is practically no absorption of moisture by the product being treated. In fact, the converse is true and, in many instances, the product is further dehydrated while being chilled. The reason for this lies in the fact that the material is hot and dry and the heat imparted therefrom to the refrigerated air reduces the relative humidity of the air so that the air becomes a drying medium even though initially saturated. Until the material becomes as cold as the air, there is no possibility of the condensation of moisture upon its surface and before this time comes, the air is separated from the material.

The means herein disclosed for the chilling of produce by direct contact with refrigerated air may be used either as the sole means of chilling the produce to the desired degree or it may be used in conjunction with the devices of my application 231,110 or 311,639 either as a pre-cooler or as a subsequent cooler to chill the material to a lower degree while it is being conveyed to packaging or storage. In fact, the several devices may be used in any desired order or relationship.

Other objects will be apparent to those skilled in the art upon the following disclosure of the invention in which:

Figure 1 shows diagrammatically in side elevation a device embodying the invention partially broken away to expose its interior structure.

Figure 2 is a detail view taken in cross section on line 2—2 of Figure 1.

Figure 3 is a view largely in longitudinal section through an alternative embodiment of the invention, portions of the conveyor troughs being broken away.

Figure 4 is a detail view taken on line 4—4 of Figure 3.

Figure 5 is a plan view of the apparatus shown in Figure 3 and Figure 4 as appears on a reduced scale.

Figure 6 is a view largely in longitudinal section to a further modified embodiment of the invention.

Figure 7 is a detail view taken in section on the line 7—7 of Figure 6.

Like parts are identified by the same reference characters throughout the several views.

In the device shown in Figure 1, a screw conveyor 8 of the mutilated thread type is provided in any desired length in a conveyor trough 9. The particular type of conveyor thread or paddle will be determined by the nature of the material handled and will further involve the question whether it is desired that the material be tossed or agitated in the air stream during conveyor movement. It further involves the question whether the desired material be conveyed rapidly, in which case a longer conveyor and trough will ordinarily be required, or whether the conveyor will be designed to retard the movement of the material in order to accomplish more cooling in given distance traveled.

In the device shown in Figure 1, the trough 9 is provided with a cover 10 enclosing the trough to constitute a closed chamber in which pre-chilled refrigerating gases are circulated. Preferably, the refrigerant will comprise ordinary air, cooled by passage over an evaporating radiator 11 in a refrigerating system which comprises the compressor 12, condenser 13, reducing valve 14 and return pipe 15. The air cooled by passage over the radiator 11 is delivered directly into refrigerating chamber as defined by the trough 9 and its top closure 10. Leaving the chamber 10 through manifold 16, the air passes to the circulating fan 17 under which it is delivered into a cyclonic separator 18 in order that dust, which the air may have derived from the material being chilled, may be segregated from the air and returned to the chilling chamber through the conduit 19.

If the air is still colder than surrounding atmospheric air, it may be recirculated through pipe 20 back to the radiator 11. The use of this pipe is optional, as frequently the efficiency of the apparatus is such, with reference to atmospheric conditions, that the air is substantially as warm as atmospheric air when released from the dust separator 18.

The material to be chilled is delivered in finely comminuted form through pipe 25 into pipe 19. Both the freshly introduced material and the dust returned from separator 18 pass into the rotary charging valve 26 driven by belt 27 from motor 28 through a speed changer 29 subject to regulation by a control mechanism 30. According to the rate at which the rotary charging valve 26 is turned, the finely divided produce or other material to be chilled is discharged into the hopper 32 which delivers it into the path of the conveyor 8.

The conveyor is driven by belt 33 from motor 34 through a speed changer 35 having control mechanism at 36. Each of the controls may comprise a fluid pressure diaphragm to which pressure is communicated through pipes 38 and 39 from a source (not shown) subject to control of a thermostatic valve mechanism 40 which is exposed to the temperature of the air withdrawn from the refrigerating chamber by fan 17. This general type of control is well known and hence is not illustrated in more detail. As specifically used in this device, it is so connected that if the temperature of the discharged air rises above the fixed value at which the thermostatic valve 40 is set, the control will function to effect a relative reduction in the rate of rotation of the charging valve 26 and a corresponding reduction in the rate of rotation of screw 8, thus reducing the amount of material contacting the air and consequently reducing the amount of heat transferred to the air.

Conversely, if the temperature of the air leaving the exhaust fan 17 becomes decreased, the rate of rotation of the charging valve 26 and the conveyor will be accelerated. Thus, a nearly constant temperature of output is maintained to keep the product uniform.

The chilled product, after being propelled by conveyor 8 through the refrigerating chamber 9, 10, is discharged through pipe 42 to sacking outlets 43, 44 which may be located on a lower floor. This device, in which the mutilated thread conveyor tosses the material into the path of the refrigerating air stream, or at least agitates the material in the conveyor, is peculiarly well adapted to handle finely divided meal and the like.

The device shown in Figure 3 is particularly intended to operate on similar material, and also on coarser, unground chopped fodder or other relatively coarser material, supplied through pipe 45 subject to the control of a rotary charger 46 similar to that shown at 26 in Figure 1 and driven by motor 280 through speed changer 290 subject to regulation by control mechanism 300.

The material discharged from the rotary charger 46 into the refrigerating chamber 110 is received in the input end of the first of a series of conveyor troughs 90, 91 and 92 in which operate screw conveyors 80, 81 and 82. These conveyors have continuous threads as clearly shown in Figure 3, but the threads are provided at suitable intervals with radial bucket flanges 84 having rounded margins to agitate and lift the material without catching thereon. The conveyors are turned in alternately opposite directions by the driving chain 330 which is driven by chain 331 from motor 340 through a speed changer 350 controlled by the regulating mechanism 360. The regulating mechanism 360 is actuated by pressure communicated to it through pipe 380 subject to the control of a thermostatic valve mechanism 400 which derives pressure through pipe 390 from a suitable source (not shown). The pressure line 380 from the valve mechanism 400 also extends to the pressure responsive regulating mechanism 300 which controls the rate at which the rotary charger 46 is operated. Thus, a rise in the temperature of the discharged air is made automatically to retard the rate of operation of the charger and the several conveyors, while a reduction in the temperature of the discharged air is made automatically to accelerate the rate of operation of the charger and the several conveyors with the result that the material is discharged at a uniform temperature. After the material passes through the whole length of trough 90, it falls through the discharge pipe 48 into trough 91. After passing from right to left (Fig. 3) through trough 91, the material is discharged through pipe 49 into trough 92. After passing through this trough, it emerges from the casing 100 through pipe 50 for sacking or storage.

The cooling radiator shown in more detail in Figure 1 is here only diagrammatically indicated at 110. The air drawn therethrough passes by means of pipe 51 into the refrigerating chamber 100, filling such chamber so that as the material is agitated in the several feed troughs it comes into direct contact with the refrigerating air to be chilled thereby. The admission 51 is preferably expanded as shown by the plan view in Figure 5 to avoid the localizing of drafts in the chamber 100.

The air, after having received heat from the material to be chilled, passes through the tapering outlet 52 at the top of the chamber into the circulating fan 170 and is discharged thereby. In this instance, no means is provided for dust separation since the finely divided or chopped stringy material to be refrigerated is here passing through relatively quiescent air as compared with the more rapidly moving and concentrated stream of air in the chamber 9, 10 of Figure 1. It will, of course, be understood that a return pipe from blower 170 to the evaporator radiator or other chilling radiator of unit 110 may be provided in the manner suggested in Figure 1, if desired.

The device shown in Figure 6 is adapted to handle material which is not comminuted or finely divided, at least to the degree to which the material must be finely divided to be handled by the devices of Figures 1 and 3. The device of Figure 6 is well adapted to handle loose or coarsely chopped hay which is forked or fed by hand into the hopper inlet 250, past the valve 261, this valve being biased by a weight 262 toward a normally closed position from which it may be pressed open by the hay. The refrigerating chamber 101 is provided with a belt conveyor 93 operating over pulleys 94 and 95, the latter being driven by belt 332 on the motor 342 through a speed changer 352 controlled by the regulating mechanism 362. The pressure line 382 controlled by the thermostatic valve mechanism 402 and supplied with pressure by a pipe 392 from a suitable source (not shown) actuates the control mechanism 362 and also actuates a gage 363 which, however it may be calibrated, will serve as a guide for the manual feeding of hay to a hopper 250. This eliminates the difficulty that would otherwise be experienced in mechanical delivery at a controlled rate into hopper 250 of material such as uncut hay and yet it enables the hay to be fed in quantities proportioned to the chilling effect of the air. The hay conveyor 93 is, however, entirely automatically controlled in accordance with output air temperature at the thermostat 402 as was explained in connection with Figure 1 and Figure 3.

The air chilling radiating apparatus 111 receives and cools the air admitted through duct 512 into the refrigerating chamber 101. The chamber is provided with baffles at 56 and 57 which alternate above and below the path of movement of the hay on the upper flight of conveyor 93. These baffles cause the air to circulate through the hay as shown by the arrows in Figure 6, passing first upwardly and then downwardly through the layer of hay carried by the foraminous conveyor 93 until finally the air, after absorbing heat from the hay, passes through the outlet pipe 162 to the exhaust fan 172 by which the air is either expelled from the apparatus or recirculated, as suggested in Figure 1.

The conveyor 93 may conveniently be provided with propelling cleats 60 which not only assure the movement of the hay with the conveyor but further wipe from the bottom of chamber 101 the accumulations of dust which have sifted through the foraminous conveyor belt 93. The cleats 60 deliver this dust in successive installments to a discharge pipe 62.

It will, of course, be understood that instead of the mechanical refrigeration devices indicated, the air may be chilled by passing cold water from any convenient natural or artificially cooled source, through the air chilling radiators 11, 110 or 111, or by direct washing with cold water.

The various types of conveyors shown are adapted to handle practically all kinds of material, but the invention contemplates that the conveyor system will be modified in accordance with requirements of the material.

In all instances, I have shown the air moved through the refrigerating chamber by the suction of an exhaust fan, but I also contemplate that the air may be driven through the system under pressure, if desired. The advantage of using an exhaust fan rather than a pressure fan for air circulation is that the reduced pressure involved in the use of the suction fan facilitates further dehydration of the product, where this is desired.

In general, the product, for the most effective practical preservation of its vitamin content, will be chilled approximately to 60 degrees Fahrenheit. Chilling much below 60 degrees is uneconomical, since main vitamin losses occur at temperatures materially in excess of 60 degrees. Moreover, too cold a product, with reference to the atmosphere, will condense moisture from the atmosphere tending to cause mold or spoilage of the product, at least at its surface.

The device shown in Figure 6 minimizes carotin and other vitamin losses in that it is capable of handling the unchopped product. The finer the product is ground, the faster the carotin loss in storage under comparable temperature conditions.

Many changes can be made in the apparatus without wholly departing from the invention as herein disclosed. For example, the chilling air may travel through the apparatus in the same direction as the food to be chilled, but a more efficient means of heat transfer is provided by counter-current movement as herein disclosed. In any case, the refrigerating gases are preferably confined in a closed space through which the food to be chilled is passed at a rate which depends upon the temperature of the gases emerging from the closed space. I also prefer to use an exhaust fan rather than a pressure fan for circulating the cooling medium over the food product, at least, in cases where the product is dehydrated, or where dehydration is desirable, for I found that, contrary to expectation, a very substantial dehydrating effect is achieved by circulating cold gases over a hot product. In practically every instance, it may be assumed that the product treated in accordance with the present invention is initially heated materially in excess of atmospheric temperatures.

I claim:

1. A method for the purposes described including the advance of highly heated finely divided organic material upon a given path, the continuous circulation of a refrigerating gas in a closed circuit including a portion of said path, the segregation from gas leaving said circuit of dust borne thereby, return of such dust to said path, and the rechilling of the refrigerating gas before the return in said circuit to said path portion.

2. In a device of the character described for the treatment of material including substantial quantities of fines, and saving the fines, said device comprising a closed circuit endless gas conduit including a gas-temperature-modifying chamber having temperature modifying means therein, a treatment chamber, and a separating chamber in series, means for introducing material to be treated into said endless conduit at one side of the treatment chamber and removing material therefrom at the other side of the treatment chamber, whereby the material treated is not passed through the temperature modifying chamber, said treatment chamber including means for the advance of such material and for the agitation and exposure of such material to gas in said conduit, means for propelling gas in substantially closed circuit through said conduit to be modified as to temperature in the chamber first mentioned and to modify in the treatment chamber the temperature of the material treated and to deliver to the separator chamber any fines entrained with the gas, and means for substantially continuously returning to the rest of the material fines separated from the gas in the separator chamber, whereby the fines are distributed throughout the treated material.

3. In a device of the character described, the combination with a conveyor for organic materials and means including a rate changer for the actuation thereof, of a closed chamber in which said conveyor operates, said chamber being provided with inlet and outlet means for the material to be conveyed and with inlet and outlet means for a refrigerating gas, a cooler for the refrigeration of gas, means for circulating a refrigerating gas through said cooler and said chamber and across said conveyor, and regulating means for said rate changer including a thermostat disposed in the path of gas which has traversed said conveyor and provided with operative connections for the adjustment of said rate changing means to increase the rate of conveyor movement in accordance with the decrease of temperature to which said thermostat is subject.

4. In a device of the character described, the combination with a conveyor for organic material and means including a rate changer for the actuation thereof, of a closed chamber in which the conveyor operates, said chamber being provided with inlet and outlet means for the material to be conveyed and with inlet and outlet means for refrigerating gas, means for circulating a refrigerating gas through said chamber and across said conveyor, regulating means for said rate changer including a thermostat disposed in the path of gas which has traversed said conveyor, said thermostat being provided with operative connections for the adjustment of said rate changing means to increase the rate of conveyor movement in accordance with the decrease of temperature to which said thermostat is subject, together with means for delivering to the conveyor material to be propelled thereby, driving connections for said delivering means including a rate changer, and control mechanism for said last mentioned rate changer including means for the actuation thereof from said thermostat concurrently with the actuation of the rate changer in the driving connections to the conveyor.

5. A device of the character described for the cooling of material including substantial quantities of fines, and saving the fines, said device comprising a closed gas circulating system including a separator having a continuously effective capacity adequate for removal of fines from recirculated gas which would otherwise clog the refrigerating means hereinafter mentioned, a treatment chamber including means for the advance of the material and for the agitation and exposure of such material to the gases circulating in said system to be cooled by such gases, and gas propelling means for maintaining gas in constant closed circuit circulation in said system, in combination with refrigerating coils in said system exposed to gas which has passed said separator and is in course of return to said chamber, means for introducing material into said system and removing material therefrom, and means for returning to and distributing in said material the fines which are removed in the separator from the circulating gas.

6. A device of the character described for the treatment of material, said device including a conduit comprising a treating chamber, means for impelling gas through said chamber, means for the admission and discharge of material to be modified as to temperature by the gas in the chamber, said chamber including a screw conveyor having flights for the agitation, lifting, propulsion, and exposure of the material in said chamber to the gases impelled therethrough, driving connections for the rotation of said screw conveyor including a speed changing device, and means for adjusting said speed changing device including a thermostat exposed to gases which have acted on material in said chamber and having connections for the movement of the speed changing device to accelerate and decelerate the rotation of said screw conveyor in a predetermined manner related to the temperature of the gas to which the material treated has been exposed.

7. A device of the character described comprising a closed gas circulating system including a dust separator, gas refrigerating means, a treatment chamber, gas propelling means, and suitable connections for delivering refrigerated gas from said refrigerating means to said chamber for cooling said material therein and thence through said separator and back to said refrigerating means, a conveyor in said chamber, means for delivering said material to said conveyor and receiving said material therefrom, together with means regulating material input to said conveyor, driving connections for said regulating means and said conveyor including rate changing means, and controls for the rate changing means including a thermostat in said system in the path of air recently traversing said chamber and operatively connected to vary the rate of said material movement to and by said conveyor inversely in accordance with the temperature of the gas to which the thermostat is subject.

8. The device of claim 5 in which the gas propelling means comprises a suction fan, whereby dehydration as well as chilling of material traversing the treatment chamber is enhanced.

9. A device of the character described comprising a closed gas circulating system including a dust separator, gas refrigerating means, a treatment chamber, gas propelling means, and suitable connections for delivering refrigerated gas from said refrigerating means to said chamber for cooling said material therein and thence through said separator and back to said refrigerating means, a conveyor in said chamber, means for delivering said material to said conveyor and receiving said material therefrom, together with means controlling the delivery of material to said conveyor, said separator being provided with a return connection to said delivery controlling means and thereby to said conveyor, said delivery controlling means and said conveyor being provided with driving connections including rate changing means, and regulating means therefor including thermostatic means in the path of air leaving said chamber and connected to vary the rate of said material movement to and by said conveyor inversely in accordance with the temperature of such air, the conveyor comprising means for not only propelling but also for agitating and lifting material in said chamber in the path of said air.

10. A device of the character described comprising a closed gas circulating system including a dust separator, gas refrigerating means, a treatment chamber, gas propelling means, and suitable connections for delivering refrigerated gas from said refrigerating means to said chamber for cooling said material therein and thence through said separator and back to said refrigerating means, a conveyor in said chamber, means for delivering said material to said conveyor and receiving said material therefrom, the conveyor comprising a foraminous belt and the chamber being provided above and below a material-carrying flight of said belt with staggered partitions adapted to direct gaseous flow back and forth through material on said belt flight.

11. Apparatus of the character described comprising in combination with a conveyor a means for the operation thereof including a rate changer, of means providing a closed chamber in which the conveyor operates, a gas refrigerating device, means for circulating a cooling gas through said device and said chamber and past said conveyor, and a thermostat exposed to the temperature of gas which has moved past said conveyor and provided with operative control connections to said rate changer for the adjustment thereof toward a decrease in the rate of conveyor movement upon an increase in the temperature of such gas.

12. A device of the character described comprising a closed gas circulating system including a dust separator, gas refrigerating means, a treatment chamber, gas propelling means, and suitable connections for delivering refrigerated gas from said refrigerating means to said chamber for cooling said material therein and thence through said separator and back to said refrigerating means, a conveyor in said chamber, means for delivering said material to said conveyor and receiving said material therefrom, said conveyor comprising a screw adapted to propel the material and to lift it for exposure to the gas, said screw comprising a generally helical propelling flight, and bucket webs with smoothly rounded edges projecting laterally from said flight at intervals whereby to be adapted to lift even relatively stringy material for aeration without entangling such material.

GERALD D. ARNOLD.